US012362419B2

(12) United States Patent
McCurry (10) Patent No.: US 12,362,419 B2
(45) Date of Patent: Jul. 15, 2025

(54) CIRCULAR SAW WITH DRAIN FEATURE

(71) Applicant: TECHTRONIC CORDLESS GP, Anderson, SC (US)

(72) Inventor: Ronald C. McCurry, West Union, SC (US)

(73) Assignee: Techtronic Cordless GP, Anderson, SC (US)

( * ) Notice: Subject to any disclaimer, the term of this patent is extended or adjusted under 35 U.S.C. 154(b) by 626 days.

(21) Appl. No.: 17/559,757

(22) Filed: Dec. 22, 2021

(65) Prior Publication Data
US 2023/0198067 A1    Jun. 22, 2023

(51) Int. Cl.
*B25F 5/02* (2006.01)
*B23D 45/16* (2006.01)
*B27B 9/00* (2006.01)
*H01M 50/24* (2021.01)

(52) U.S. Cl.
CPC ............ *H01M 50/24* (2021.01); *B23D 45/16* (2013.01); *H01M 2220/30* (2013.01)

(58) Field of Classification Search
CPC ............ H01M 50/24; H01M 2220/30; H01M 50/691; H01M 50/247; H01M 50/571; B23D 45/16; B27B 9/00
USPC ........................................ 30/166.3, 515, 388
See application file for complete search history.

(56) References Cited

U.S. PATENT DOCUMENTS

| | | | |
|---|---|---|---|
| 3,971,132 A * | 7/1976 | Griffies | B23D 49/165 30/393 |
| 8,563,163 B2 | 10/2013 | Hayashi et al. | |
| 9,196,879 B2 | 11/2015 | Hayashi et al. | |
| 9,267,291 B1 | 2/2016 | Ramsey et al. | |
| 9,350,000 B2 | 5/2016 | Hayashi et al. | |
| RE46,429 E | 6/2017 | Hayashi et al. | |
| 9,786,878 B2 | 10/2017 | Hayashi et al. | |
| 9,899,645 B2 | 2/2018 | Hayashi et al. | |
| 11,128,011 B2 | 9/2021 | Wagner et al. | |
| 2007/0057502 A1* | 3/2007 | Shafik | E03C 1/20 285/121.3 |
| 2011/0162862 A1 | 7/2011 | Suzuki et al. | |

(Continued)

FOREIGN PATENT DOCUMENTS

| | | |
|---|---|---|
| CN | 111180630 A | 5/2020 |
| EP | 2849260 A1 | 3/2015 |

(Continued)

*Primary Examiner* — Adam J Eiseman
*Assistant Examiner* — Robert D Cornett
(74) *Attorney, Agent, or Firm* — Michael Best & Friedrich LLP (57) ABSTRACT

A portable circular saw including a housing that has a first housing side, a second housing side coupled to the second side, and a lower housing portion spanning the first housing side and the second housing side. The saw also includes a battery receptacle that is formed in the housing, and the battery receptacle extends partially into the first housing side and partially into the second housing side. The battery receptacle includes a bottom plate that is spaced apart from the lower housing portion to form an interior cavity within the housing. A drain feature extends between the bottom plate of the battery receptacle and the lower housing portion, and the drain feature defines an outlet for fluid in the battery receptacle.

20 Claims, 9 Drawing Sheets

(56) References Cited

U.S. PATENT DOCUMENTS

| | | | |
|---|---|---|---|
| 2013/0328523 A1* | 12/2013 | Ota | H02J 7/0045 |
| | | | 320/107 |
| 2014/0182143 A1* | 7/2014 | Morita | A01D 34/90 |
| | | | 30/276 |
| 2017/0294787 A1* | 10/2017 | Taga | H02J 7/0013 |
| 2018/0207831 A1* | 7/2018 | Masatoshi | B25F 5/02 |
| 2018/0369939 A1 | 12/2018 | Zimmerman et al. | |
| 2020/0001729 A1* | 1/2020 | Matsuyama | B60L 50/66 |
| 2020/0267903 A1* | 8/2020 | Gao | A01D 34/78 |
| 2020/0287397 A1 | 9/2020 | Jiao et al. | |
| 2020/0303933 A1* | 9/2020 | Murakami | H01M 10/44 |
| 2020/0406415 A1* | 12/2020 | Shimizu | B25F 5/008 |
| 2021/0151945 A1* | 5/2021 | Yamaguchi | H01M 10/425 |
| 2021/0205904 A1 | 7/2021 | Schmitz et al. | |
| 2022/0102825 A1* | 3/2022 | Downey | H01M 50/271 |

FOREIGN PATENT DOCUMENTS

| | | |
|---|---|---|
| EP | 3890100 A1 | 10/2021 |
| WO | 2021064950 A1 | 4/2021 |

* cited by examiner

CIRCULAR SAW WITH DRAIN FEATURE

BACKGROUND

The present invention relates to construction tools, and more particularly to battery powered circular saws.

A mainstay of most construction sites are circular saws. Circular saws are very important tools and are used to cut all types of wood.

SUMMARY

In one aspect, the present invention includes a portable circular saw is disclosed and includes a housing including a first housing side, a second housing side coupled to the second side, and a lower housing portion spanning the first housing side and the second housing side. The portable circular saw further includes a battery receptacle formed in the housing, wherein the battery receptacle extends partially into the first housing side and partially into the second housing side and wherein the battery receptacle includes a bottom plate spaced apart from the lower housing portion to form an interior cavity within the housing and a drain feature extending between the bottom plate of the battery receptacle and the lower housing portion, wherein the drain feature defines an outlet for fluid in the battery receptacle.

In another aspect, the invention includes a portable circular saw including a housing that defines an interior region and a battery receptacle configured to receive a removable battery pack. The saw also includes a motor disposed in a portion of the interior region, and a plate that is coupled to the housing and that guides the saw along a surface. The saw further includes a drain feature that is disposed at a lowermost portion of the battery receptacle and that extends downward from the battery receptacle when the plate is oriented in a horizontal configuration. The drain feature drains fluid from the battery receptacle through the housing without entering the interior region of the housing.

Other features and aspects of the disclosure will become apparent by consideration of the following detailed description and accompanying drawings.

Before any embodiments of the present invention are explained in detail, it is to be understood that the embodiments described herein are not limited in scope or application to the details of construction and the arrangement of components set forth in the following description or as illustrated in the following drawings. The devices described herein are capable of other embodiments and of being practiced or of being carried out in various ways. Also, it is to be understood that the phraseology and terminology used herein is for the purpose of description and should not be regarded as limiting.

DETAILED DESCRIPTION

Figure 1:
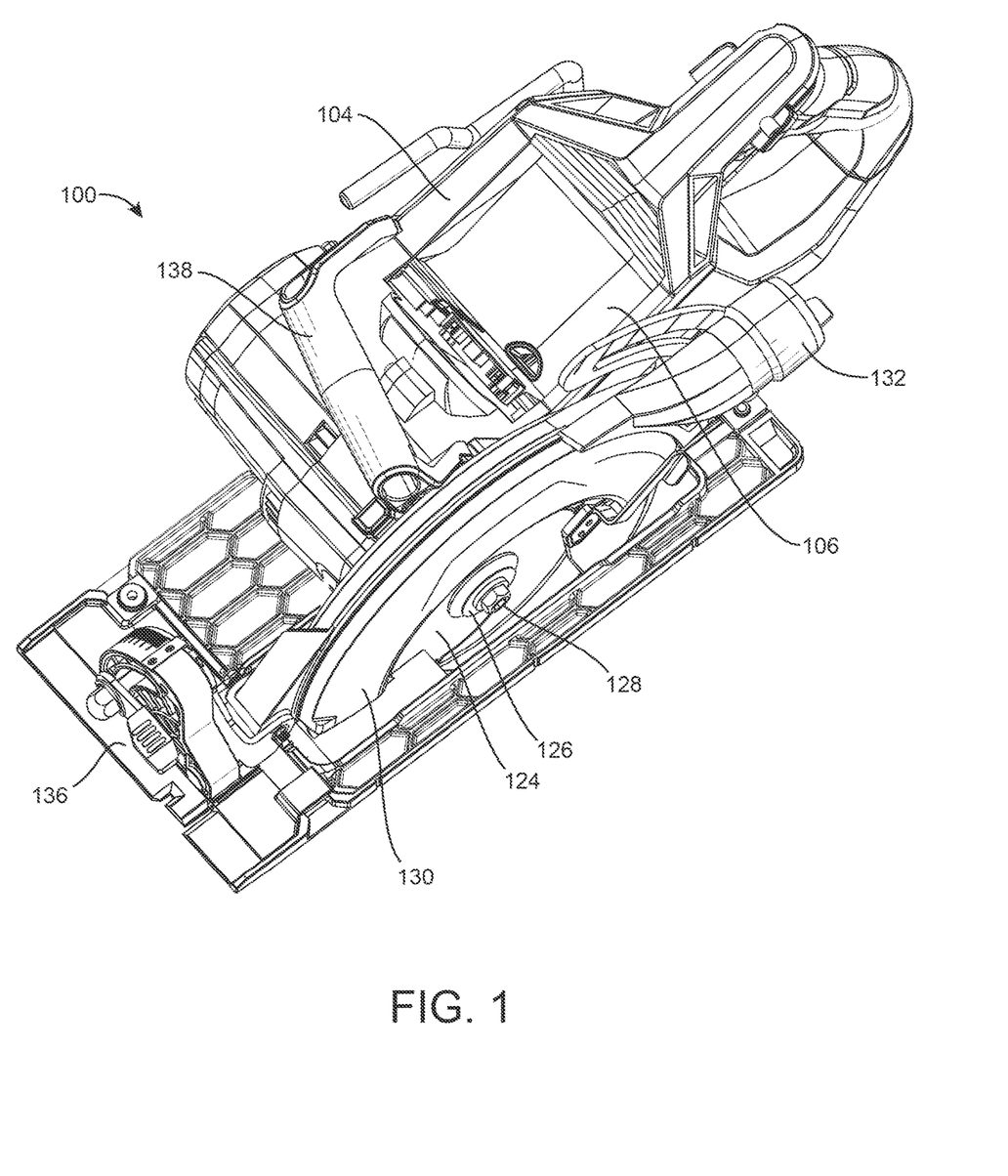
FIG. 1 is a perspective view of a circular saw in accordance with an embodiment of the present invention.
Figure 2:
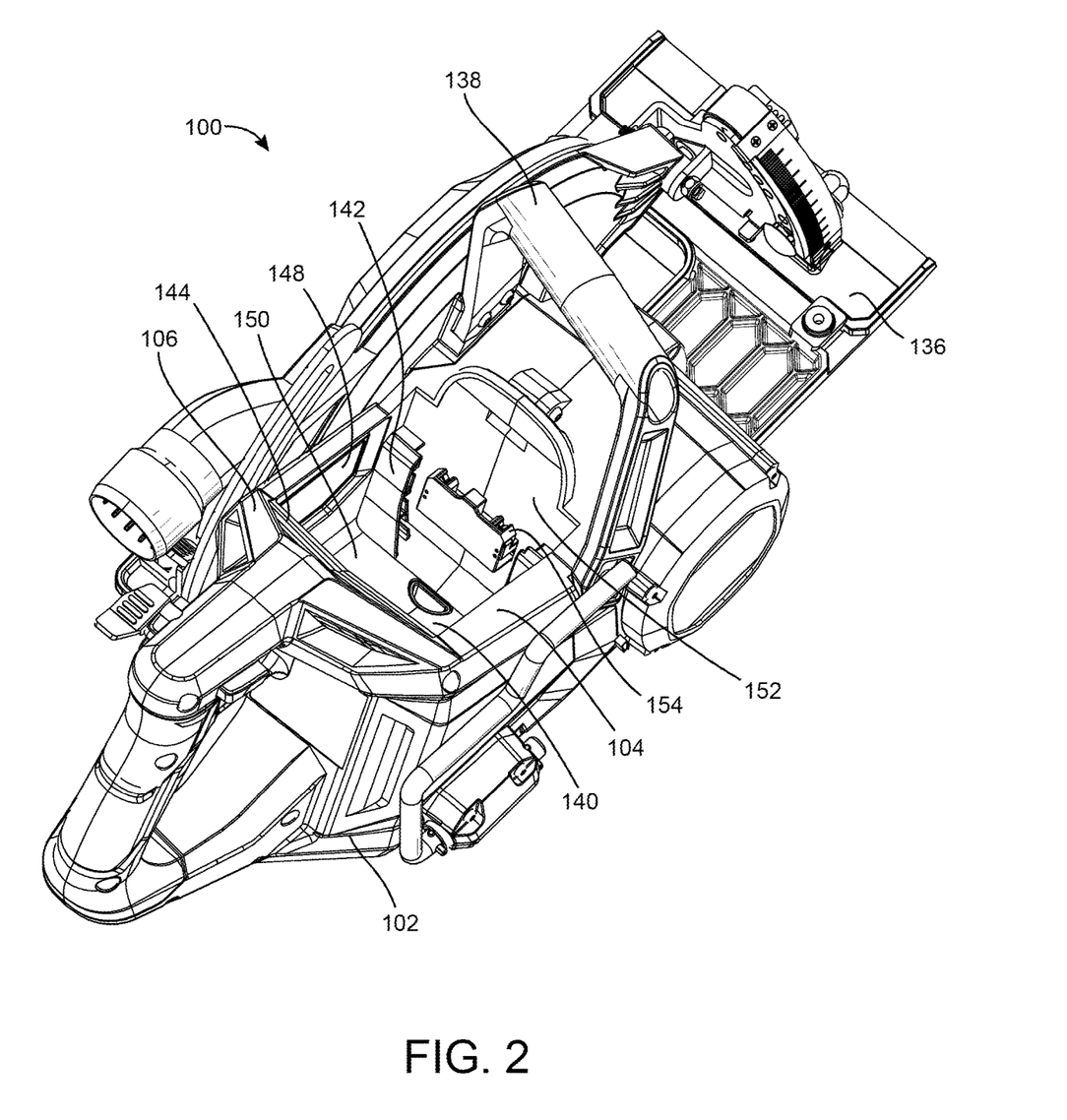
FIG. 2 is another perspective view of the circular saw of FIG. 1.
Figure 3:
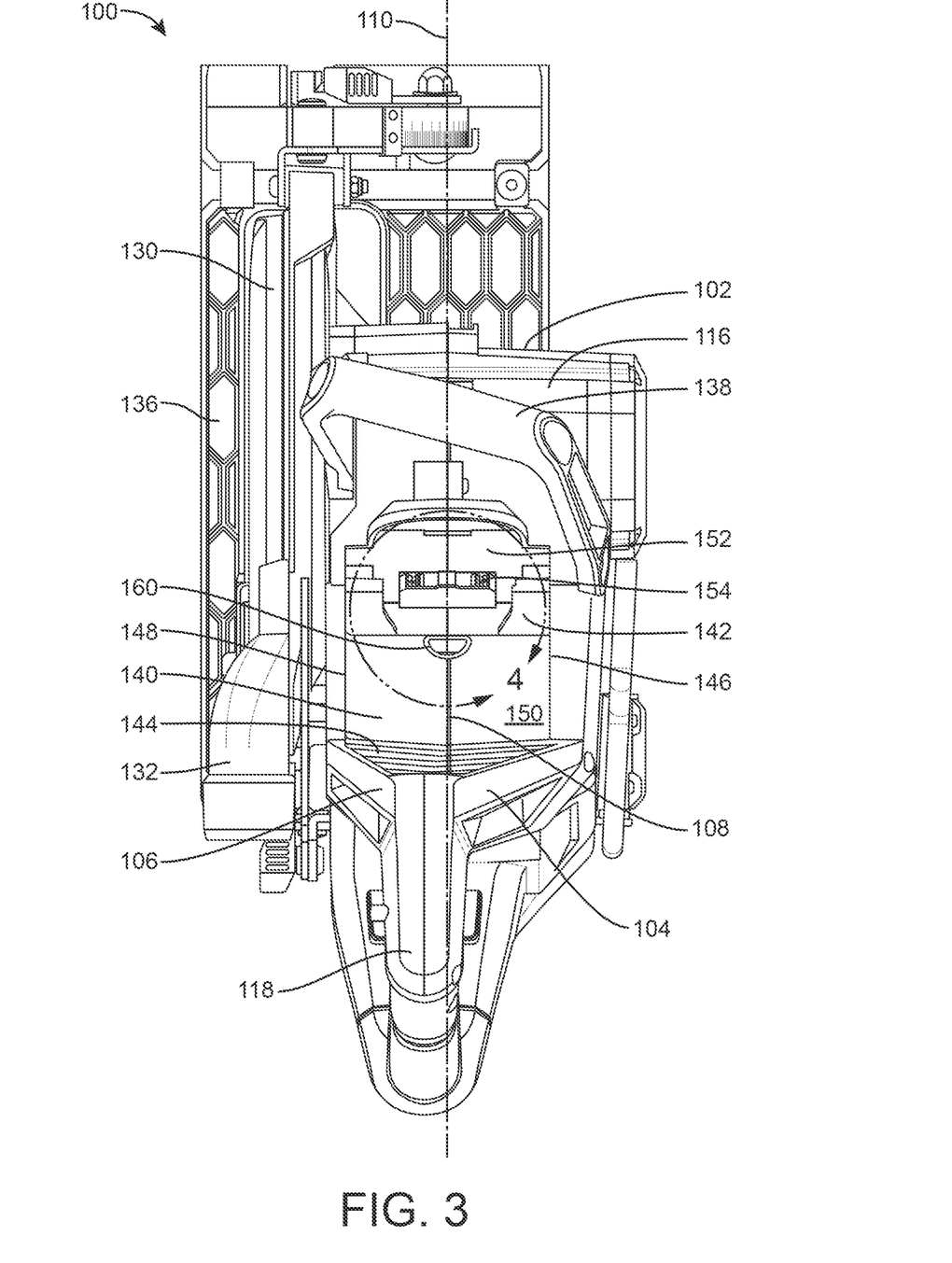
FIG. 3 is a top view of the circular saw of FIG. 1.
Figure 4:
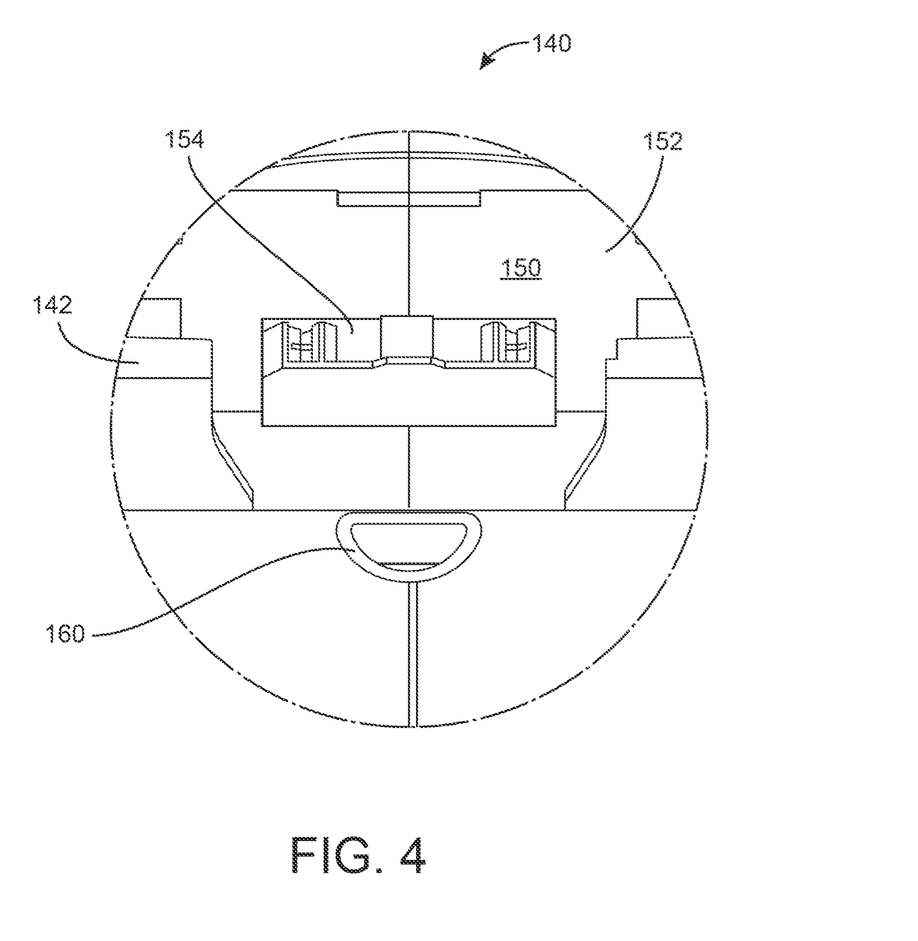
FIG. 4 is an enlarged view taken at Circle 4 in FIG. 3 illustrating a portion of the circular saw including a battery receptacle and a drain feature.
Figure 5:
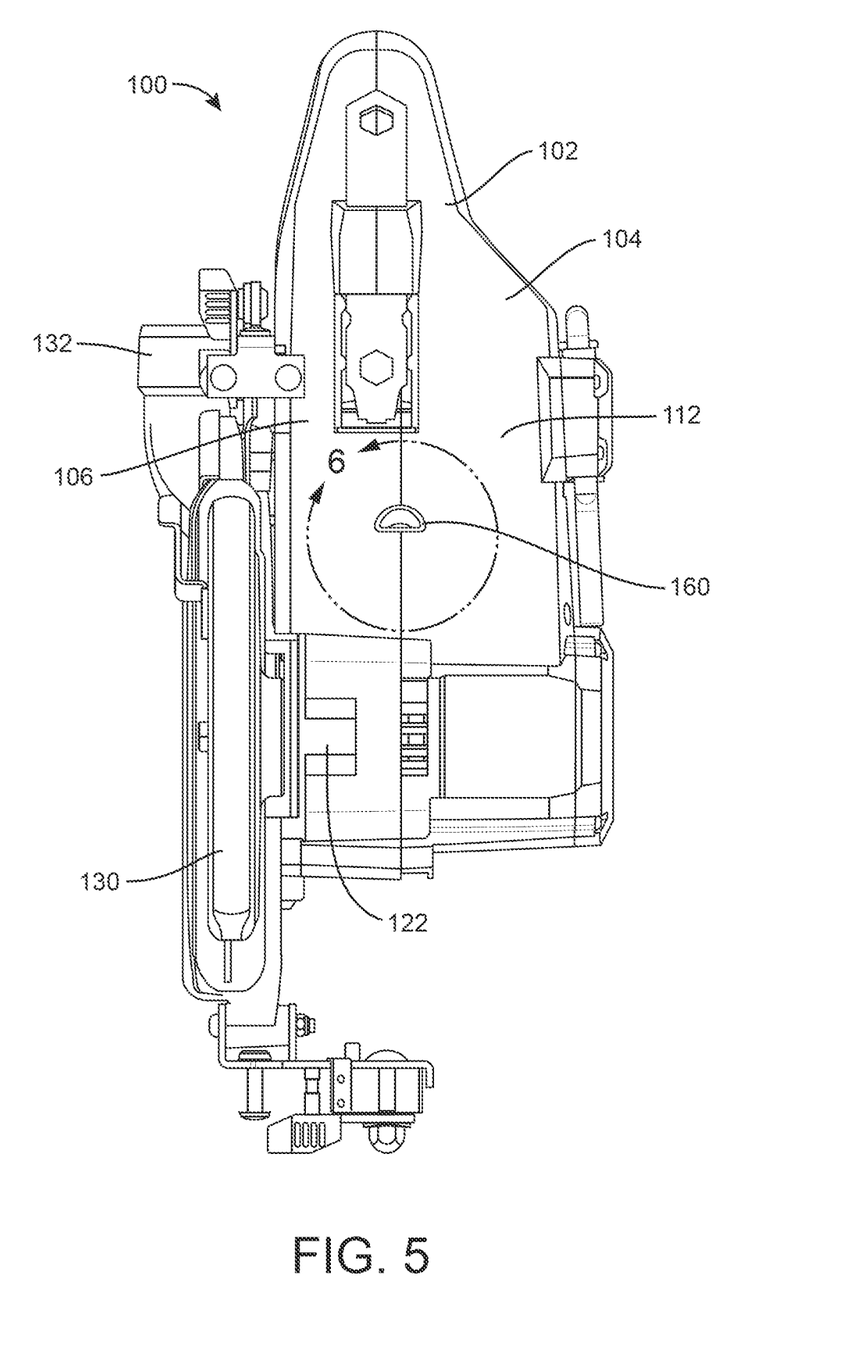
FIG. 5 is a bottom view of the circular saw of FIG. 1 with a bottom plate removed.
Figure 6:
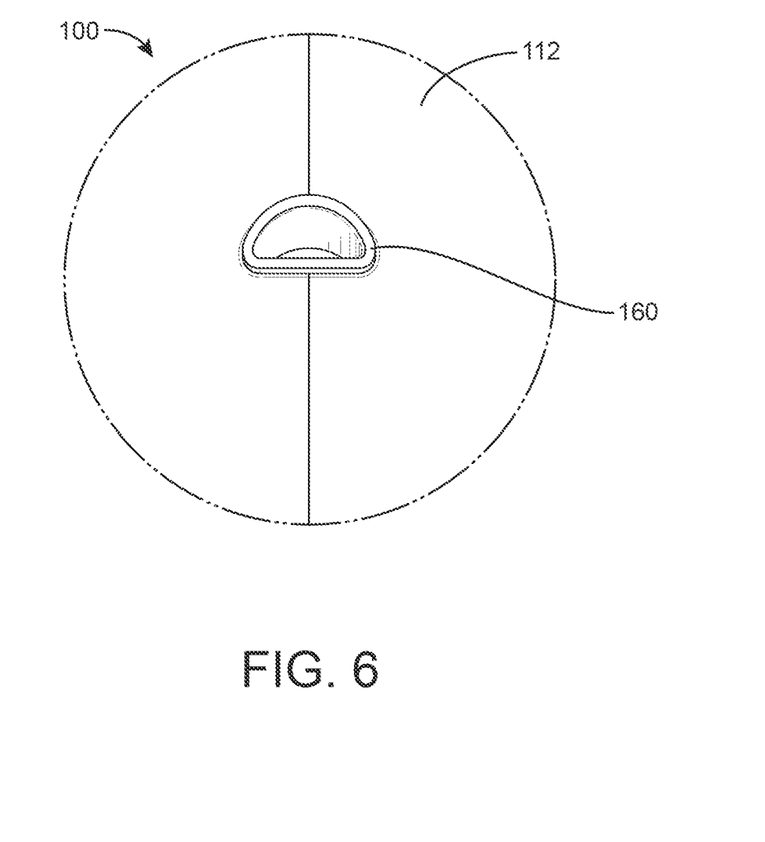
FIG. 6 is an enlarged view taken at Circle 6 in FIG. 5 illustrating a portion of the circular saw including the drain feature.

FIGS. 1-8 illustrate a circular saw 100 including a housing 102 that has a first housing portion 104 and a second housing portion 106. As best shown in FIG. 3, the housing portions 104, 106 meet to form an interface 108 that extends at least partially along a longitudinal axis 110. It is to be understood that the housing portions 104, 106 are attached, or otherwise affixed, to each other (e.g., via a plurality of fasteners such as screws, an adhesive, plastic welding, etc.). FIG. 5 shows a lower side of the housing portions 104, 106.

Figure 7:
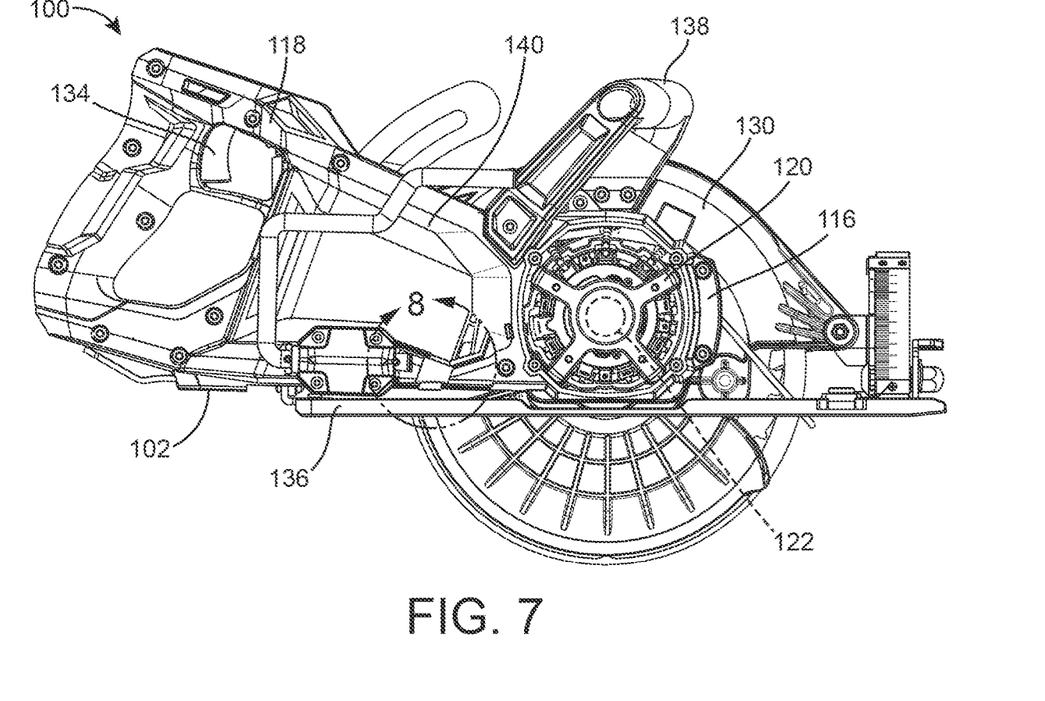
FIG. 7 is a side view of the circular saw of FIG. 1 with a portion of the housing removed.

As best illustrated in FIG. 7, the housing 102 includes an interior or motor region 116 and a handle region 118. The motor region 116 includes a motor 120 that has a rotatable drive shaft 122. Referring back to FIG. 1, the saw 100 includes a saw blade 124 that is coupled to the drive shaft 122 and that rotates with the drive shaft 122 during operation. The saw blade 124 is removably engaged with the drive shaft 122 and is held in place by a blade flange 126 and a blade lock 128 (e.g., a bolt). The circular saw 100 also includes a blade guard 130 that is affixed to, or otherwise disposed on, the housing 102. The blade guard 130 extends at least partially around the saw blade 124 to protect a user from the rotating saw blade 124 during operation, and to direct saw dust into a dust collector tube 132. The dust collector tube 132 may be coupled to a vacuum system hose (not shown). A dust collection bag (not shown) may be removably engaged with the dust collection tube 132.

As shown in FIG. 7, the circular saw 100 includes a trigger 134 in the handle region 118. The trigger 134 is operable to actuate the motor 120 and rotate the drive shaft 122. A bottom plate 136 is mounted to the housing 102 to act as a guide during operation of the circular saw 100. The bottom plate 136 is movable or pivotable relative to the housing 102 in a first direction to change a depth of cut of the saw blade 124, and separately movable in a second direction to change an angle of cut, or bevel, of the saw blade 124. The circular saw 100 also includes an upper handle 138 affixed, or otherwise attached, to the housing 102. It is to be understood that the circular saw 100, like most circular saws, is operable using two hands. The handle portion 118 is a primary handle that is used to push, or otherwise move, the circular saw 100 along a workpiece to be cut. Moreover, the upper handle 138 is a secondary handle that is used to guide the circular saw 100 as it cuts the workpiece. In certain instances, a user may provide input via both the handle portion 118 and the upper handle 138 to move the circular saw 100 into the workpiece and guide the circular saw 100 while doing so.

Figure 8:
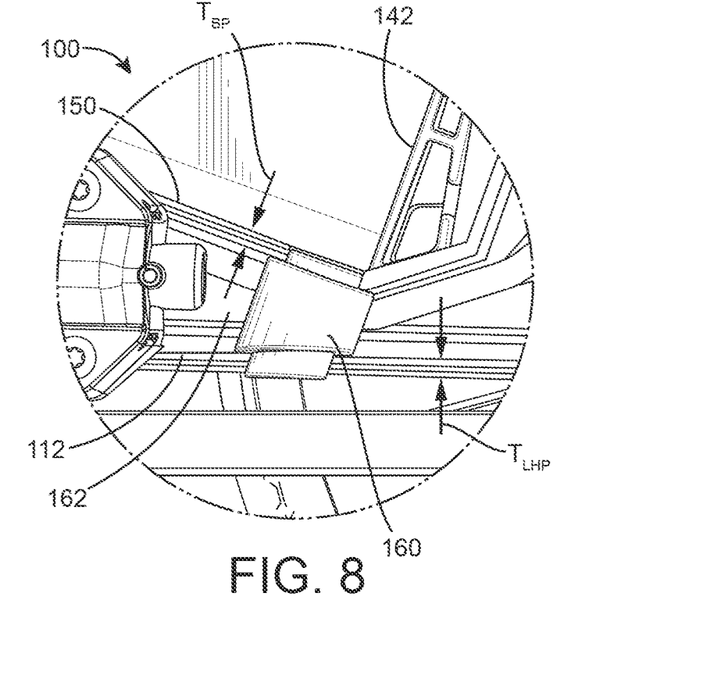
FIG. 8 is an enlarged view of the circular saw taken at Circle 8 in FIG. 7.

FIGS. 1-3 and 7 illustrate that the housing 102 includes or defines a battery receptacle 140 between the motor region 116 and the handle region 118. As shown, the battery receptacle 140 extends, or is recessed, into the top of the housing 102 of the circular saw 100. Further, the battery receptacle 140 spans the first housing portion 104 and the second housing portion 106. As best shown in FIGS. 2-4, the battery receptacle 140 includes a front wall 142 and a back wall 144, and first and second side walls 146, 148 that extend between the front wall 142 and the back wall 144. The battery receptacle 140 also includes a bottom plate 150 that extends between the front wall 142, the back wall 144, the first side wall 146, and the second side wall 148. As shown in FIG. 8, the bottom plate 150 of the battery receptacle 140 is angled downward from the back wall 144 to the front wall 142 when the bottom plate 136 is horizontal (see FIG. 7).

As shown in FIG. 4, the circular saw 100 includes a battery slot 152 that is formed in the front wall 142 of the battery receptacle 140. The battery slot 152 is sized and shaped to removably engage a complementary-sized and shaped feature on a removable battery pack (not shown). FIG. 4 further shows a battery connection 154 that is disposed in the base of the battery slot 152. The battery connection 154 is sized and shaped to receive a complementary-sized and shaped feature on the removable battery pack. Accordingly, the battery pack may be engaged with the battery receptacle 140, and when the battery pack is engaged with the battery receptacle 140, the battery pack is electrically and operably coupled with the circular saw 100 via the battery connection 154 to provide power to the motor 120. It is to be understood that the battery receptacle 140 may also be configured to receive a battery pack that has a stem.

FIGS. 1-8 illustrate that the circular saw 100 also includes a drain feature 160 (e.g., drain tube) that is coupled to and in fluid communication with the battery receptacle 140. As shown, the drain feature 160 is coupled to the bottom plate 150 of the battery receptacle 140 adjacent to the front wall 142 of the battery receptacle 140. As best shown in FIG. 8, the drain feature 160 extends between the bottom plate 150 and the lower housing portion 112, and the drain feature 160 defines an outlet for fluid that may otherwise accumulate in the battery receptacle 140. That is, the drain feature 160 provides a drain directly from the bottom plate 150 of the battery receptacle 140 through the lower housing portion 112 while preventing fluid from entering the interior space or cavity 162 between the bottom plate 150 of the battery receptacle 140 and the lower housing portion 112 of the housing 102. In a particular embodiment, the drain feature 160 may be constructed from a weatherproof material. For example, the drain feature 160 may be constructed from a polymer material. The polymer material may be a natural polymer such as natural rubber or a synthetic polymer. Synthetic polymers may include polyethylene, polypropylene, polystyrene, polyvinyl chloride, synthetic rubber, phenol formaldehyde resin (or Bakelite), neoprene, nylon, polyacrylonitrile, PVB, silicone, or a combination thereof.

Figure 9:
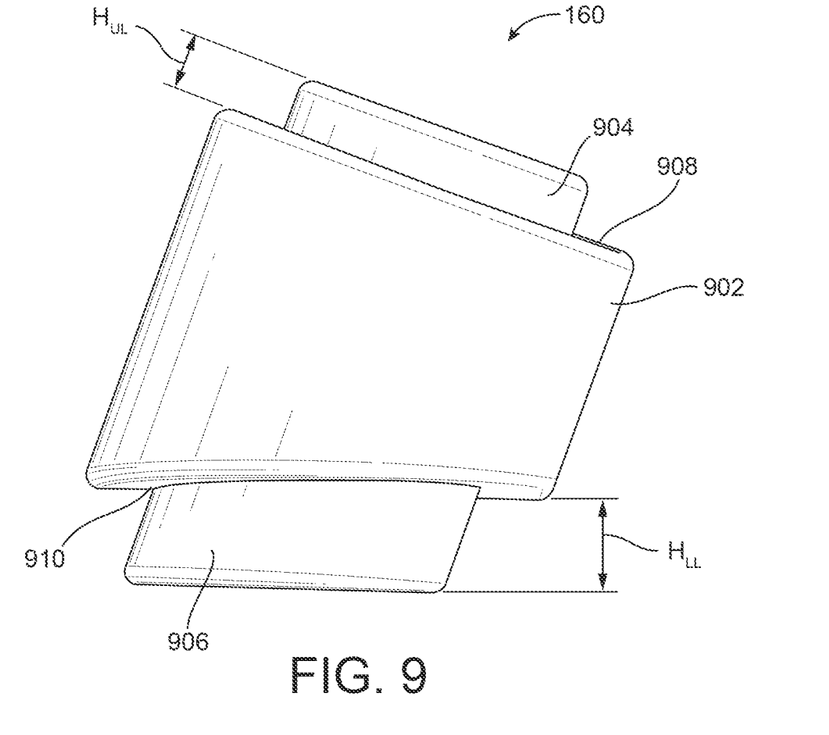
FIG. 9 is a side view of the drain feature of the circular saw.
Figure 10:
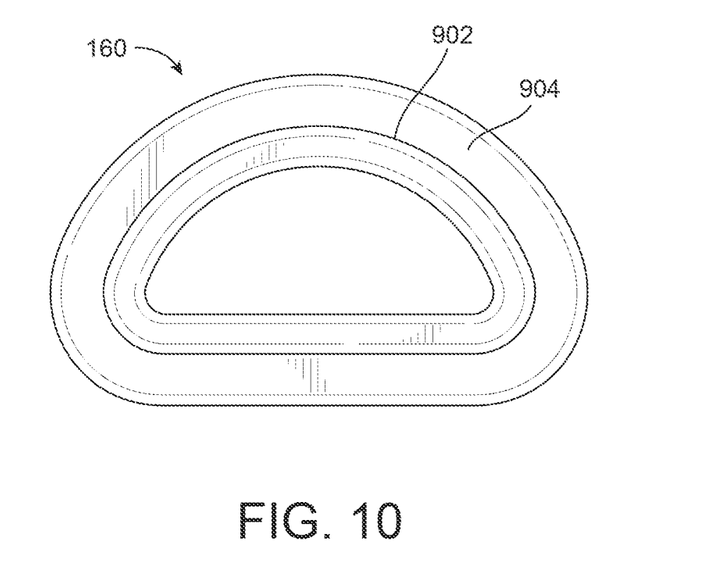
FIG. 10 is a top view of the drain feature.
Figure 11:
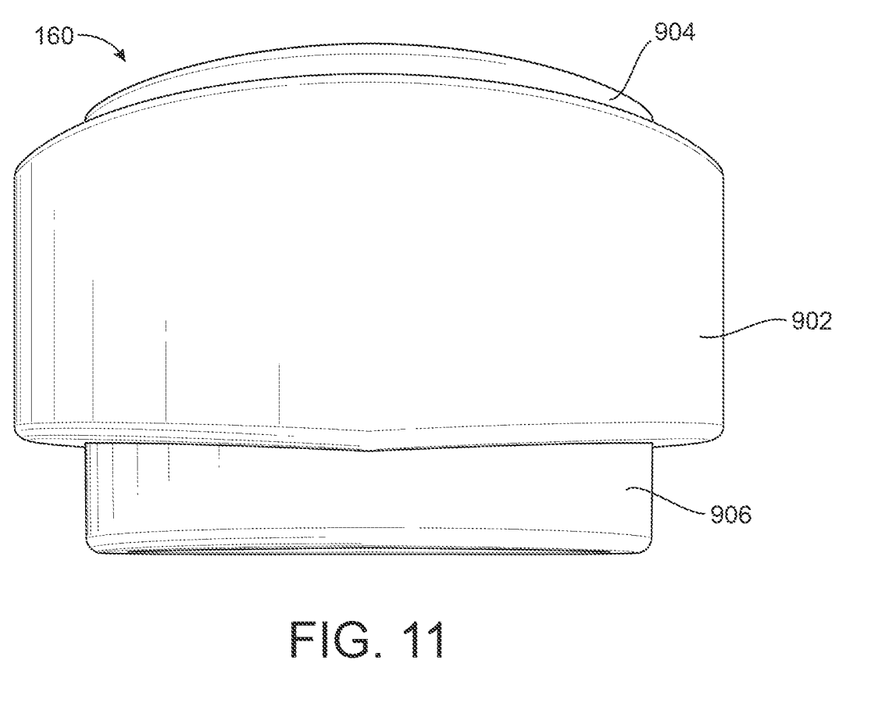
FIG. 11 is a rear view of the drain feature.
Figure 12:
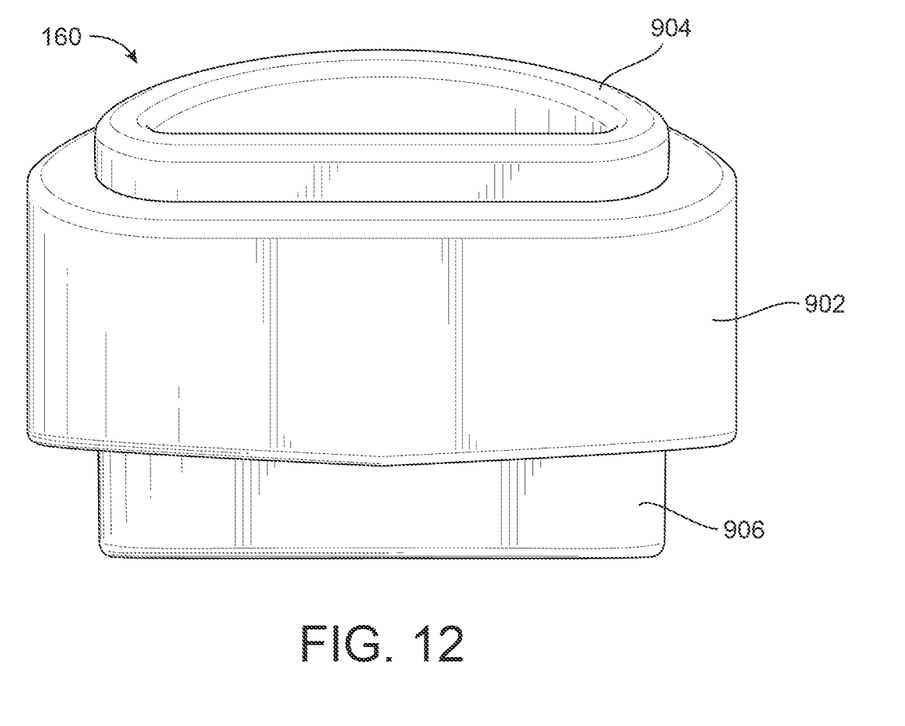
FIG. 12 is a front view of the drain feature.

Referring to FIGS. 9-12, the drain feature 160 includes a central body 902 and an upper lip 904 that extends in a generally upward direction from the central body 902 (as viewed in FIG. 9). The upper lip 904 extends into an upper hole formed in the bottom plate 150 of the battery receptacle 140. The drain feature 160 also includes a lower lip 906 that extends in a generally downward direction from the central body 902 opposite the upper lip 904 (as viewed in FIG. 9). The lower lip 906 extends into a lower hole formed in the lower portion 112 of the housing 102. As shown, the drain feature 160 has an upper shoulder 908 around the upper lip 904, and the drain feature 160 has a lower shoulder 910 around the lower lip 906. When the drain feature 160 is coupled to the housing 102, the upper shoulder 908 abuts the bottom plate 150 of the battery receptacle 140 and the upper lip 906 is flush with a bottom of the battery receptacle 140.

In other words, the upper lip 906 does not extend into the battery receptacle 140. Moreover, the lower shoulder 910 abuts the lower housing portion 112 of the housing 102. The drain feature 160 cooperates with the bottom plate 150 of the battery receptacle 140 and the lower housing portion 112 of the housing 102 to direct fluid out of the battery receptacle 140 without allowing fluid into the interior space 162 between the bottom plate 150 of the battery receptacle 140 and the lower housing portion 112 of the housing 102. In this way, the drain feature 160 prevents fluid from compromising the motor 120 and other electric components within the housing 102. In this way, the lifetime of the circular saw 100 and the electric components therein may be improved or otherwise prolonged.

Referring back to FIG. 8, the bottom plate 150 of the battery receptacle 140 defines a thickness $T_{BP}$ and the lower housing portion 112 defines a thickness $T_{LHP}$. FIG. 9 shows that the upper lip 904 of the drain feature 160 defines a height $H_{UL}$, and the lower lip 906 of the drain feature 160 defines a height $H_{LL}$. In one construction, and as illustrated, the height $H_{UL}$ of the upper lip 904 is substantially the same as the thickness $T_{BP}$ of the bottom plate 150 of the battery receptacle 140, and the height $H_{LL}$ of the lower lip 904 is substantially the same as the thickness $T_{LHP}$ of the lower housing portion 112 of the housing 102. This arrangement provides a smooth transition between the bottom plate 150 of the battery receptacle 140 and the upper lip 904 of the drain feature 160 to provide proper drainage from the battery receptacle 140.

Although the invention has been described in detail with reference to certain preferred embodiments, variations and modifications exist within the scope of one or more independent aspects of the invention as described.

Various features of the invention are set forth in the following claims.

The invention claimed is:

1. A portable circular saw comprising:
   a housing including:
      a first housing side;
      a second housing side coupled to the first housing side at an interface defined therebetween; and
      a third housing portion spanning the first housing side and the second housing side below the first and second housing sides when the housing is oriented upright in use;
      a battery receptacle formed in the housing, wherein the battery receptacle extends partially into the first housing side and partially into the second housing side, the battery receptacle having a bottom plate spaced apart from the third housing portion to form an interior space within the housing, wherein the bottom plate is opposite an opening of the battery receptacle that is configured to receive a battery pack; and
   a discrete drain feature mounted between the bottom plate of the battery receptacle and the third housing portion, wherein the drain feature defines an outlet for fluid in the battery receptacle, and
   wherein the drain feature is disposed at the interface.

2. The portable circular saw of claim 1, wherein the drain feature defines a drain directly from the bottom plate of the battery receptacle through the third housing portion.

3. The portable circular saw of claim 1, wherein the drain feature comprises a central body, a first lip extending in a first direction from the central body and a second lip extending in a second direction from the central body opposite the first lip.

4. The portable circular saw of claim 3, wherein the bottom plate defines a thickness $T_{BP}$ and the first lip defines a height $H_{UL}$, and wherein the height $H_{UL}$ is the same as the thickness $T_{BP}$.

5. The portable circular saw of claim 3, wherein the third housing portion defines a thickness $T_{LHP}$ and the second lip has a height $H_{LL}$, and wherein the height $H_{LL}$ is the same as the thickness $T_{LHP}$.

6. The portable circular saw of claim 1, further comprising a plate mounted to the housing to act as a guide during operation along a surface, wherein the battery receptacle includes a first wall, a second wall, a first side wall extending between the first wall and the second wall, and a second side wall extending between the first wall and the second wall, wherein the bottom plate is angled downward from the second wall to the first wall when the plate is oriented horizontally.

7. The portable circular saw of claim 6, wherein the drain feature is installed in the bottom plate adjacent to the first wall of the battery receptacle, and wherein the drain feature is attached to the housing by engagement between the first housing side and the second housing side.

8. The portable circular saw of claim 3, wherein the drain feature further comprises a first shoulder around the first lip, and wherein the first shoulder abuts the bottom plate.

9. The portable circular saw of claim 3, wherein the drain feature further comprises a second shoulder around the second lip, and wherein the second shoulder abuts the third housing portion.

10. A portable circular saw comprising:
a housing defining an interior region and a battery receptacle configured to receive a removable battery pack;
a motor disposed in a portion of the interior region;
a plate coupled to the housing and configured to guide the saw along a surface; and
a drain feature defined by a body formed separate from the housing and attached to the housing, the drain feature coupled to and disposed at an innermost portion of the battery receptacle relative to an opening of the battery receptacle, and the drain feature extending downward from the battery receptacle when the plate is oriented in a horizontal configuration such that the housing is above the plate, the drain feature configured to drain fluid from the battery receptacle through the housing without entering the interior region of the housing.

11. The portable circular saw of claim 10, wherein the battery receptacle has a bottom plate defining the innermost portion of the battery receptacle, wherein the drain feature is coupled to the bottom plate.

12. The portable circular saw of claim 10, wherein the body of the drain feature comprises a central body, a first lip extending in a first direction from the central body and a second lip extending in a second direction from the central body opposite the first lip.

13. The portable circular saw of claim 12, wherein the battery receptacle has a bottom plate defining the innermost portion of the battery receptacle, and wherein the first lip is flush with an interior side of the bottom plate of the battery receptacle.

14. The portable circular saw of claim 10, wherein the battery receptacle has a bottom plate defining the innermost portion of the battery receptacle, wherein the battery receptacle includes a first wall, a second wall, a first side wall extending between the first wall and the second wall, and a second side wall extending between the first wall and the second wall, and wherein the bottom plate is angled downward from the second wall to the first wall when the plate is oriented horizontally.

15. The portable circular saw of claim 14, wherein the drain feature is installed in the bottom plate adjacent to the first wall of the battery receptacle.

16. The portable circular saw of claim 14, wherein the drain feature includes a first shoulder abutting the bottom plate from outside the battery receptacle.

17. A portable circular saw comprising:
a housing including a housing portion having a first hole;
a battery receptacle formed in the housing above the housing portion, wherein the battery receptacle includes a bottom plate and an opening opposite the bottom plate and configured to receive a removable battery pack, and wherein the bottom plate has a second hole and is spaced apart from the housing portion; and
a discrete drain feature attached to the housing and extending between the bottom plate and the housing portion, wherein the drain feature comprises:
a central body;
a first lip extending in a first direction from the central body into the second hole such that the first lip is separate from and received by the second hole; and
a second lip extending in a second direction from the central body opposite the first lip into the first hole such that the second lip is separate from and received by the first hole.

18. The portable circular saw of claim 17, wherein the bottom plate of defines a bottom plate thickness and the first lip defines a height that is the same as the bottom plate thickness.

19. The portable circular saw of claim 17, wherein the drain feature includes a first shoulder abutting the bottom plate from outside the battery receptacle, and wherein the first shoulder is established between the central body and the first lip.

20. The portable circular saw of claim 17, wherein the first lip does not extend into the battery receptacle.

\* \* \* \* \*